US011682982B1

(12) United States Patent
Fine et al.

(10) Patent No.: US 11,682,982 B1
(45) Date of Patent: Jun. 20, 2023

(54) POWER INTERFACE TO AN INVERTER SUBSYSTEM

(71) Applicant: Lunar Energy, Inc., Mountain View, CA (US)

(72) Inventors: Kevin Richard Fine, Redwood City, CA (US); Mark Holveck, Sunnyvale, CA (US); Conrad Xavier Murphy, San Francisco, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/901,212

(22) Filed: Sep. 1, 2022

(51) Int. Cl.
  *H02M 7/44* (2006.01)
  *H02J 7/00* (2006.01)

(52) U.S. Cl.
  CPC ............ *H02M 7/44* (2013.01); *H02J 7/0068* (2013.01)

(58) Field of Classification Search
  CPC ................................. H02M 7/44; H02J 7/0068
  See application file for complete search history.

(56) References Cited

U.S. PATENT DOCUMENTS

| 7,248,490 | B2 | 7/2007 | Olsen |
| 9,263,968 | B2 | 2/2016 | Potts |
| 9,379,639 | B2 | 6/2016 | Mumtaz |
| 10,135,361 | B2 | 11/2018 | Dent |
| 10,857,897 | B2 | 12/2020 | Narla |
| 2011/0216562 | A1* | 9/2011 | Gengenbach ............ H02J 3/42 363/71 |
| 2018/0037121 | A1* | 2/2018 | Narla .................... H02J 7/35 |
| 2018/0083453 | A1* | 3/2018 | Chang ................... H02J 3/381 |
| 2021/0044123 | A1 | 2/2021 | Miller |
| 2021/0083506 | A1 | 3/2021 | Rao |
| 2021/0211057 | A1 | 7/2021 | Esteghlal |

OTHER PUBLICATIONS

Author Unknown, Installation Guide EV Charging Single Phase Inverter with SetApp Configuration For Europe, APAC and South Africa Version 1.5, May 2020, pp. 1-88.
Author Unknown, Installation Guide Smart EV Charger with SetApp Configuration for North America Version 1.1, Jul. 2020, pp. 1-61.

* cited by examiner

*Primary Examiner* — Jared Fureman
*Assistant Examiner* — Duc M Pham
(74) *Attorney, Agent, or Firm* — Van Pelt, Yi & James LLP

(57) ABSTRACT

An inverter subsystem that includes a direct current (DC) bus, a DC terminal, and a power storage interface that is configured to be connected to power storage. The DC terminal is configured to be: (1) connected to the DC bus via an internally-facing side of the DC terminal and (2) connected to a load via an externally-facing side of the DC terminal. The load is powered via the DC terminal.

20 Claims, 10 Drawing Sheets

US 11,682,982 B1

POWER INTERFACE TO AN INVERTER SUBSYSTEM

BACKGROUND OF THE INVENTION

Residential power systems (e.g., which may include a photovoltaic array, energy storage such as a battery, and/or an electric vehicle charger) are becoming increasingly popular due to their environmental benefits, the more widespread adaptation of electric vehicles, and the increasing frequency of power loss events (e.g., public safety power shutoff events, an unplanned loss of power due to extreme weather, etc.). New (e.g., residential) power systems that offer advantages and/or conveniences over existing power systems would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques and/or systems that provide, expose, or otherwise output a direct current (DC) terminal are described herein. In some embodiments, the DC terminal is provided by an inverter subsystem that is part of a (e.g., residential) power system and the provided DC terminal is used to power a load, such as an appliance, an electric vehicle (EV) charger, etc. The following figure describes one example process of providing a DC terminal.

Figure 1:
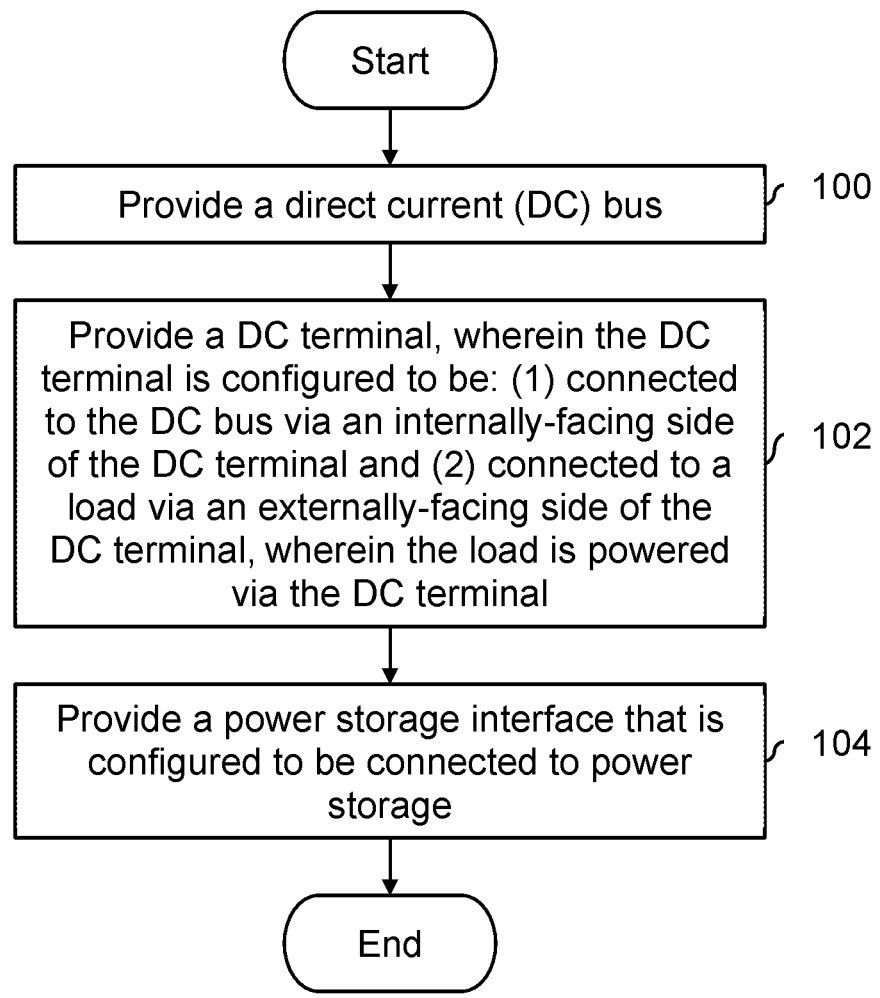
FIG. 1 is a flowchart illustrating an embodiment of a process to provide a direct current (DC) terminal that is configured to be connected to a DC bus via an internally-facing side and a load via an externally-facing side.

FIG. 1 is a flowchart illustrating an embodiment of a process to provide a direct current (DC) terminal that is configured to be connected to a DC bus via an internally-facing side and a load via an externally-facing side. In some embodiments, the process of FIG. 1 is performed by an inverter subsystem that is part of a (e.g., residential) power system.

At 100, a direct current (DC) bus is provided. As will be described in more detail below, in some embodiments, the DC bus is at a variable voltage (e.g., where the voltage of the DC bus ranges between some minimum voltage and some maximum voltage) as opposed to a fixed voltage. Changing or otherwise adjusting the voltage of the DC bus may permit the system (e.g., the inverter subsystem and/or a power system that includes the inverter subsystem) to operate more efficiently.

At 102, a DC terminal is provided, wherein the DC terminal is configured to be: (1) connected to the DC bus via an internally-facing side of the DC terminal and (2) connected to a load via an externally-facing side of the DC terminal and the load is powered via the DC terminal. As indicated by the name, the DC terminal provides a DC power supply to the load, not an alternating current (AC) power supply. In some embodiments, the DC terminal (e.g., mechanically) has a wired connection and that goes through a conduit but is not necessarily a plug-in connection.

As will be described in more detail below, in some embodiments, the voltage that the DC terminal supplies to the load is a variable DC voltage (e.g., where the voltage can be set or otherwise adjusted, as or if desired). Conceptually, the DC bus is tapped into whereas in some other systems and/or configurations, the DC bus would otherwise never exit the power system. In some embodiments, this provides access to all of the power available in the power system (e.g., from a connected photovoltaic array and a power grid, in addition to that stored in the batteries of the power system), but the load isn't necessarily directly connected to any of those power sources (e.g., there is a converter between each of those power sources and the DC bus).

At 104, a power storage interface that is configured to be connected to power storage is provided. As will be described in more detail below, in some embodiments, the power system is a modular and residential power system, where a configurable or adjustable number of battery modules can be used in combination with an inverter subsystem. In some embodiments, a power system includes a photovoltaic (PV) array and power generated by the PV array is passed to the power storage (e.g., battery) via the power storage interface.

It is noted that the techniques described herein are possible even in embodiments without batteries. For example, the DC bus may be connected to the grid and the photovoltaic array through converters.

One benefit to the process of FIG. 1 is that it extends the lifetime of an already-installed breaker panel and/or avoids the need to upgrade a breaker panel in at least some cases. A common limitation and/or impediment when other types of power systems are installed is the home's breaker panel. Breaker panels often tend to be at or near capacity, both physically and electrically. Physically, the breaker panel has a limited and/or fixed number of slots and oftentimes all of the slots are already occupied by a breaker. Electrically, limitations on current passing through the breaker panel must be respected in order to comply with municipal codes, pass inspection, and/or for safety in general. The 120% rule is one such rule that limits the sum of all current (e.g., measured in amperes) passing through the breaker panel to be less than or equal to 120% of the (main) rating associated with the main breaker in the breaker panel.

Suppose a homeowner wants to install an EV charger (or, more generally, a load) in their home and they have a traditional (e.g., residential) power system already installed in the home. The EV charger requires a 50 A breaker and an open slot in the breaker panel would be required for that breaker. Electrically, the 50 A that would be pulled by the EV charger counts towards and would have to comply with the 120% rule. Oftentimes, there is no physical space in the breaker panel and/or the 120% rule would be violated by the new load, requiring a new breaker panel (e.g., with a higher electrical rating and/or more physical slots) to be installed by a licensed electrician. This is time consuming, expensive, and/or requires new equipment (e.g., a new breaker panel).

In contrast, with a system (e.g., a power system or an inverter subsystem) that provides a DC terminal, a load (such as an EV charger, appliance, etc.) can be powered by the provided DC terminal without having to connect the load (e.g., directly) to the breaker panel. This may avoid a situation where the breaker panel needs to be upgraded (e.g., to add an open slot or increase the (main) rating of the main breaker to avoid violating the 120% rule). In addition to the convenience and time savings to the installer and homeowner, this can extend the lifetime of the breaker panel that is already installed, which is desirable for device lifetime and environmental reasons.

Another benefit of a DC terminal is that a DC power supply may be more faster because the load can take more power, not just the energy from the grid connection (which is limited by the breaker it is installed on) in the case of an AC charger. In some embodiments, all of the power that the breaker can supply (e.g., through the breaker for the power storage system) plus any power the photovoltaic array is putting out plus power from the battery system.

Some other (e.g., residential) power storage systems include an inverter with an EV charger built in. Although such a configuration offers some of the speed and breaker-related advantages offered by the embodiments described herein, the disadvantage is that the electric vehicle may not be close to where the inverter is desired. It is also not a multi-purpose device (e.g., it can only charge electric vehicles and cannot be used to charge (as an example) appliances in the home).

Yet another (e.g., residential) power storage system includes an AC charger product which can be wired into AC terminals in an inverter. Again, this provides the speed and breaker-related advantages but this other system (as well as the one above) is not connected to a battery, which is a disadvantage. Compared to that configuration, at least some of the embodiments described herein have an efficiency and/or cost advantage. For example, solar would go from DC to AC then go into a charger that is AC to DC. In embodiments described herein, the energy is already on a DC bus, and this voltage is relatively close to EV charge voltages. Although a DC/DC converter may be included in claimed DC chargers (e.g., to convert from the DC bus voltage to the EV charge voltage) such a DC/DC converter would be relatively small and high efficiency since the input and output voltages are similar.

To better understand FIG. 1, it may be helpful to describe example systems which perform the process of FIG. 1. The following figures describe some embodiments of power systems and/or inverter subsystems that perform the process of FIG. 1.

Figure 2:
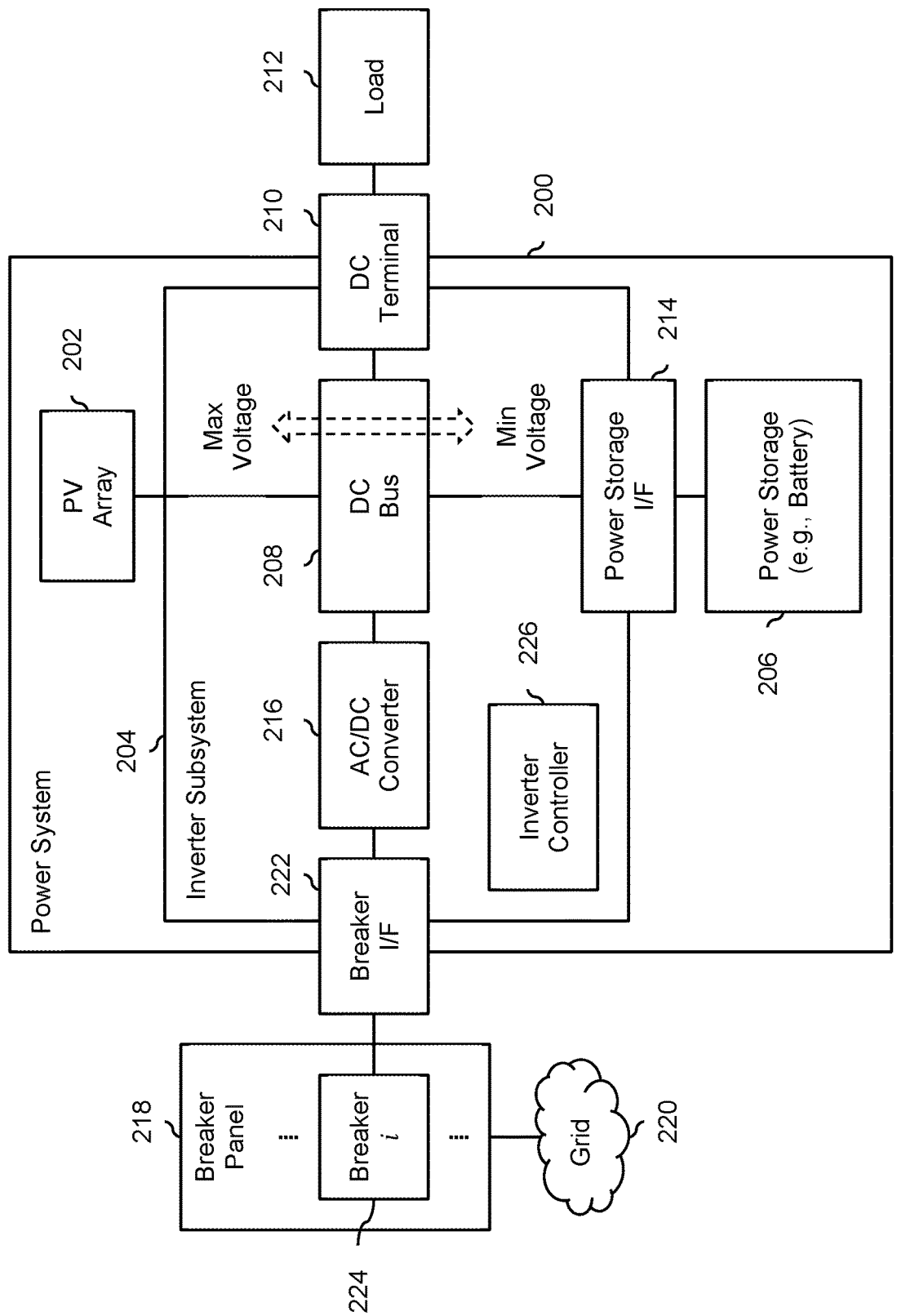
FIG. 2 is a diagram illustrating an embodiment of a power system which includes an inverter subsystem that provides a DC terminal to power a load.

FIG. 2 is a diagram illustrating an embodiment of a power system which includes an inverter subsystem that provides a DC terminal to power a load. In this example, a (e.g., residential) power system (200) includes a PV array (202) that generates power, an inverter subsystem (204) that manages power, and power storage (206) that stores power (e.g., using one or more batteries). As used herein, the term "power system" refers to a system which includes components, devices, and/or subsystems that generate, store, and/or manage power. Although the PV array (202) is shown as part of the power system (200) in this example, in some other embodiments a PV array is considered external to a power system (e.g., a PV array is manufactured by a first company and a second company manufactures a power system that includes an inverter subsystem and power storage and the two systems are coupled to each other). To preserve the readability of the diagram, some components and/or features are not necessarily shown. For example, there may be a power converter between each PV panel in the PV array (202) and the DC bus (208), as well as between the battery (206) and the DC bus (208).

Returning briefly to FIG. 1, the inverter subsystem (204) is one example of a device or system that performs the process of FIG. 1. For example, the DC bus (208) is one example of the DC bus that is provided at step 100 in FIG. 1. The DC terminal (210) is connected to the DC bus (208) via an internally-facing side and to a load (212) via an externally-facing side, per step 102 in FIG. 1. Similarly, the power storage interface (214) is configured to be connected to the power storage (206) as recited in step 104 in FIG. 1.

The inverter subsystem (204) in this example includes an AC/DC converter (216) which converts the DC signal or power (e.g., associated with the DC bus (208)) into an AC signal or power (e.g., associated with the breaker panel (218) and/or grid (220)), and vice versa. In some embodiments, the AC/DC converter includes or otherwise comprises a power inverter. In various embodiments, current or power can flow in one or both directions and conversion from AC-to-DC as well as DC-to-AC is supported as or if needed. In some embodiments, power from the PV array (202) is fed to the grid (220) when there is an excess of power generated by the PV array (202). The AC/DC converter (216) would in that case perform DC-to-AC conversion. In some embodiments, the PV array (202) is insufficient to power the load (212) and the power storage (206) is empty. In that scenario, the AC/DC converter (216) would perform AC-to-DC conversion.

As is shown in this example, in some embodiments, a system (further) includes a breaker interface (e.g., 222) that is configured to be connected to a breaker (e.g., 224) in a breaker panel (e.g., 218). In this example, the inverter subsystem (204) provides the breaker interface (222) and the breaker panel (218) is in turn connected to the grid (220).

In this example, the DC bus (208) has a variable voltage that ranges between a minimum and maximum voltage (e.g., 380 V to 500 V, respectively). In this example, the DC bus (208) is normally or nominally at 400 V but in some cases, the voltage of the DC bus (208) is changed (e.g., by the inverter controller (226)) to improve the efficiency of devices in the system.

As is shown in this example, in some embodiments, the DC bus (e.g., 208) and the DC terminal (e.g., 210) both have a variable voltage (e.g., continuously varying, as opposed to a step function) and the load (e.g., 212) is able to operate using the stepwise, variable voltage provided by the DC terminal. In some embodiments, some appliances such as heat pumps, water heaters, etc. may be more amenable to being powered by a stepwise, variable voltage provided by the DC terminal because they can still operate, albeit with varying degrees of performance, depending upon the voltage of the power supply. In some embodiments, a load includes a DC/DC terminal at the input of its power supply in order to generate a power supply with a more regulated or fixed voltage.

The inverter subsystem (204) in this example further includes an inverter controller (226) which performs a variety of operations associated with monitoring, managing, and/or decision-making associated with the storage, sourcing, and/or provision of power. A more detailed example of an inverter controller is described below.

In some embodiments, an inverter subsystem also provides or otherwise exposes one or more AC terminals in addition to one or more DC terminals. The following figure describes one example of this.

Figure 3:
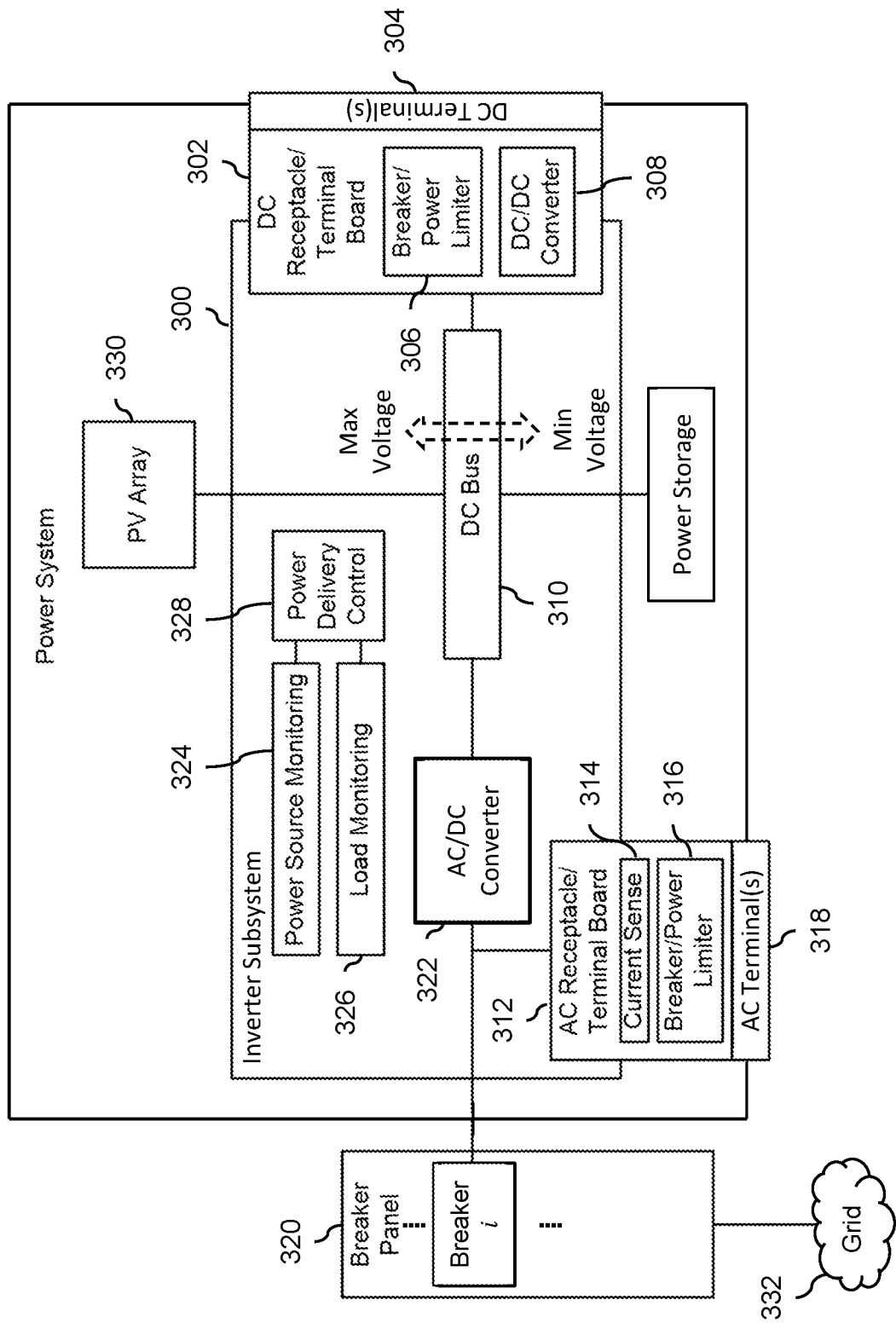
FIG. 3 is a diagram illustrating an embodiment of a power system which includes an inverter subsystem that provides a DC terminal and an AC terminal.

FIG. 3 is a diagram illustrating an embodiment of a power system which includes an inverter subsystem that provides a DC terminal and an AC terminal. For brevity, components which were previously described above in FIG. 2 are not described again. For readability, some components shown in FIG. 2 are not shown in this figure.

In this example, the inverter subsystem (300) includes a DC receptacle and/or terminal board (302) which in turn includes one or more DC terminal(s) (304). The DC receptacle and/or terminal board (302) also includes a breaker and/or power limiter (306) as well as a DC/DC converter (308). In this example, the DC/DC converter (308) is used to turn the (e.g., continuously) variable voltage of the DC bus (310) into a constant DC voltage at the DC terminal(s) (304) so that any load (not shown) connected to the DC terminal(s) can be powered by a constant voltage. For example, some loads may be designed to operate at a fixed or constant voltage and the DC/DC converter permits the DC terminal(s) to be used with such loads. In some embodiments, there are multiple DC terminals and each DC terminal has a corresponding DC/DC converter so that multiple loads that run off of different voltages can be supported.

As is shown in this example, in some embodiments, the system (further) includes a DC/DC converter (e.g., 308) located between the DC bus (e.g., 310) and the DC terminal (e.g., 304), wherein: the DC bus has a variable voltage; the DC/DC converter generates a fixed voltage from the variable voltage of the DC bus; and the DC terminal provides the fixed voltage generated by the DC/DC converter to the load.

The inverter subsystem (300) in this example also includes an AC receptacle and/or terminal board (312) which in turn includes a current sense module (314), a breaker and/or power limiter (316), and one or more AC terminal(s) (318). For example, a load (not shown) that uses an AC power supply can be coupled to the AC terminal(s) (318). As with the DC terminal(s) (304), the AC terminal(s) are beneficial because they provide an alternate connector for loads which would otherwise have to be connected to the breaker panel (320) and be subject to the physical and electrical limitations associated therewith.

As is shown in this example, in some embodiments, the system (further) includes an AC/DC converter (e.g., 322) located between the DC bus (e.g., 310) and a breaker panel (e.g., 320) as well as an AC terminal (e.g., 318), wherein the AC terminal is configured to be: (1) connected to the AC/DC converter via an internally-facing side of the AC terminal and (2) connected to a second load via an externally-facing side of the AC terminal and the second load is powered via the AC terminal.

In this example, the inverter subsystem shows a more specific example of the inverter controller (226) from FIG. 2. In this example, the inverter controller is implemented using a power source monitoring module (324) and load monitoring module (326), both of which control a power delivery control module (328). For example, the power source monitoring module (324) may monitor the power delivered by the PV array (330) and the load monitoring module (326) may monitor the power drawn by the load(s) connected to the DC terminal (304) and/or the AC terminal (318); if the power supplied by the PV array (330) is insufficient then the power delivery control module (328) may supplement it with (or completely switch over to) power from the grid (332).

The following figures show example renderings of an inverter subsystem that has a terminal board with AC terminals and DC terminals.

Figure 4A:
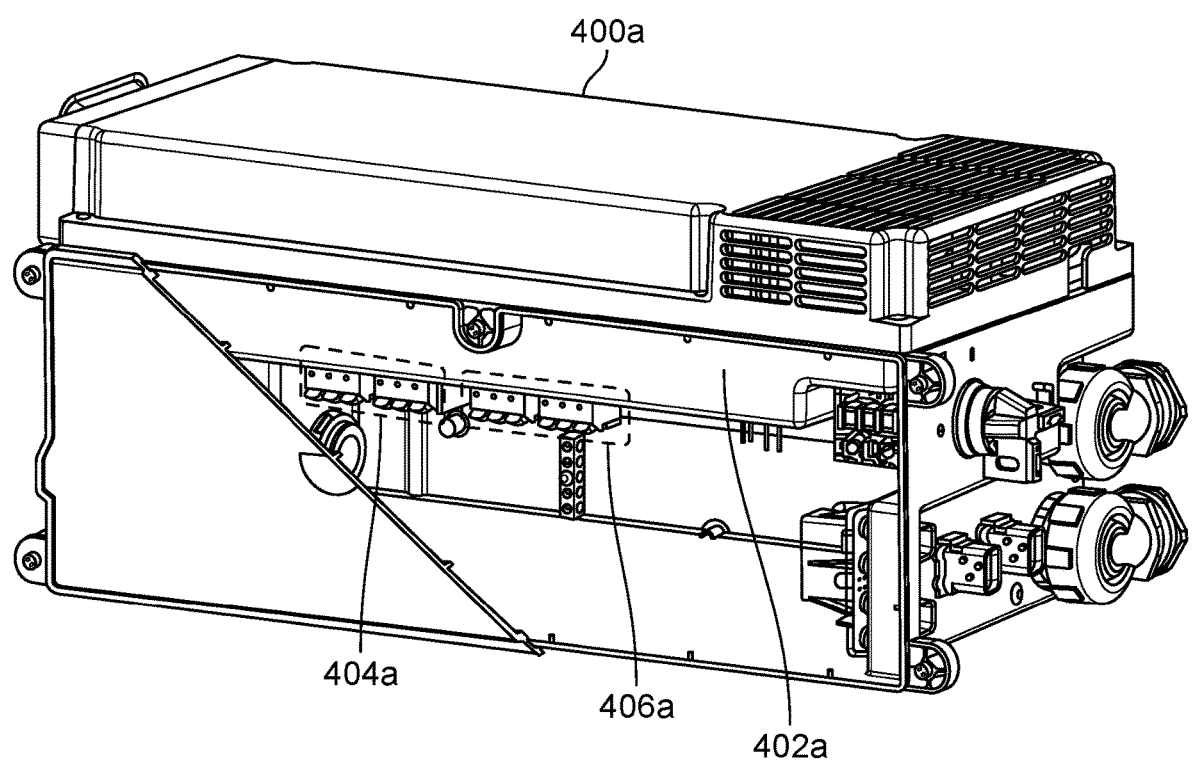
FIG. 4A is a diagram illustrating a perspective-view embodiment of an inverter subsystem with a terminal board that has AC terminals and DC terminals.

FIG. 4A is a diagram illustrating a perspective-view embodiment of an inverter subsystem with a terminal board that has AC terminals and DC terminals. For visibility, some of the external surfaces or panels of the inverter subsystem (400a) have been removed from the diagram to better show parts of interest. In this example, the terminal board (402a) corresponds to and/or otherwise includes the DC receptacle and/or terminal board (302) and AC receptacle and/or terminal board (312) from FIG. 3. In this example, the terminal board (402a) has two AC terminals (404a) and two DC terminals (406a).

Figure 4B:
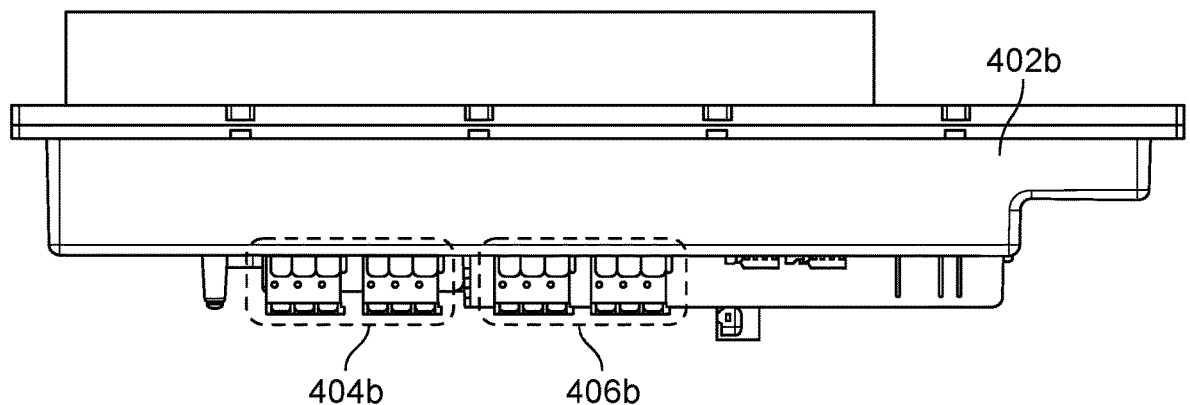
FIG. 4B is a diagram illustrating a side-view embodiment of a terminal board with AC terminals and DC terminals.

FIG. 4B is a diagram illustrating a side-view embodiment of a terminal board with AC terminals and DC terminals. FIG. 4B continues the example of FIG. 4A and shows the terminal board (402b), AC terminals (404b), and DC terminals (406b) from a side view with other components of the inverter subsystem excluded.

Figure 4C:
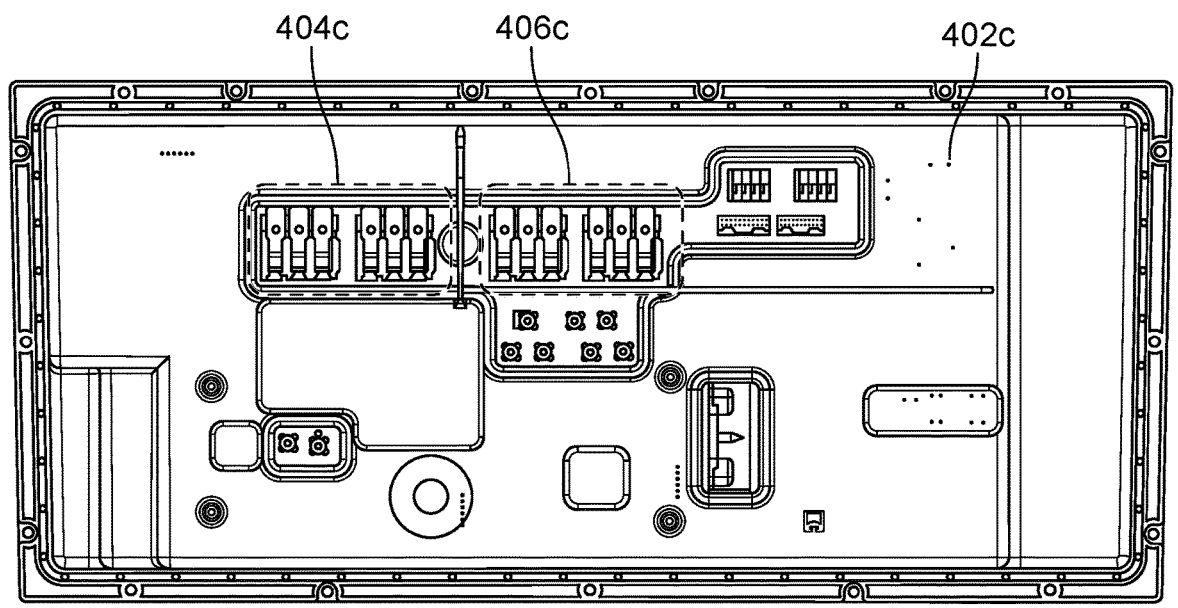
FIG. 4C is a diagram illustrating a bottom-view embodiment of a terminal board with AC terminals and DC terminals.

FIG. 4C is a diagram illustrating a bottom-view embodiment of a terminal board with AC terminals and DC terminals. FIG. 4C continues the example of FIGS. 4A and 4B and shows the terminal board (402c), AC terminals (404c), and DC terminals (406c) from a bottom view.

Returning briefly to FIG. 4A, in some embodiments, an inverter subsystem (e.g., 400a) is part of a modular power system where a variable or adjustable number of power storage modules are able to be used with an inverter subsystem (e.g., depending upon a desired power storage capacity). The following figure describes an example where a DC terminal is provided by an inverter subsystem in a modular power system.

Figure 5:
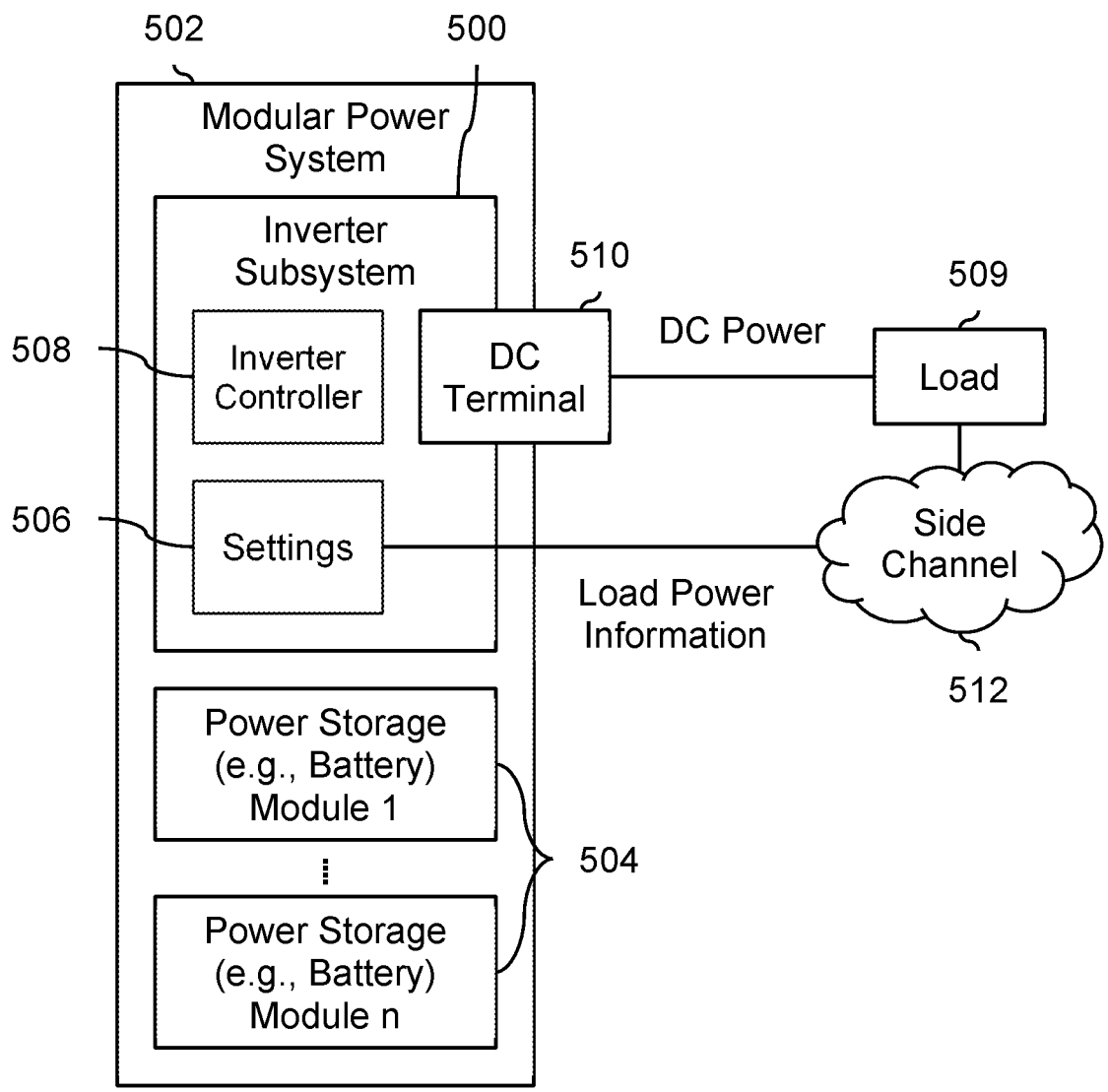
FIG. 5 is a diagram illustrating an embodiment of a modular power system with an inverter subsystem that has a DC terminal.

FIG. 5 is a diagram illustrating an embodiment of a modular power system with an inverter subsystem that has a DC terminal. In this example, the inverter subsystem (500) is part of a modular power system (502) that is installed in a home. The exemplary inverter subsystem (500) shown here is one example of a system that performs the process of FIG. 1. For readability, some components which were described in above examples that are not relevant to this example are not necessarily shown.

In this example, the power system (502) is modular in nature so that one or more power storage (e.g., battery) modules (504) can be used in combination with the inverter subsystem (500). For example, each power storage module (504) may have its own case or enclosure and the power storage modules (504) are stacked vertically with the inverter subsystem (500) at the top.

To support the modular nature of the power storage system (502), the inverter subsystem (500) in this example includes one or more settings (506) that are configurable and are used by the inverter controller (508) to manage power in the system and/or make power-related decisions. In this example, the settings (506) include a setting associated with the number of power storage modules (504) that are managed by the inverter subsystem (500). For example, some homeowners may choose a modular power system (502) with only two energy storage modules because of cost and/or their relatively low power needs. Other homeowners may opt for a larger configuration (e.g., five battery blocks) because they want more power storage capacity. In some embodiments, during some final assembly process at a factory or during installation of the residential modular power storage system (502), the settings (506) are self-configured. For example, the battery modules go onto the DC bus in parallel, so there is no voltage difference as different numbers of battery modules are added. In some such embodiments, when the battery modules are plugged in, they self-identify on a Controller Area Network (CAN) communications link.

A controller (508) in the inverter subsystem (500) uses the number of battery blocks, as well as other settings (506), in its decision making, as or if needed. Some examples of decision making performed by the controller (508) using the settings (506) relate to the charging or discharging of the battery blocks (504), as well as (e.g., from what power source) the load (509) is powered via the DC terminal (510). Some examples of decision making and/or changes made by the controller (508) are described in more detail below.

As shown in this example, in some embodiments, the inverter subsystem is included in a modular power system; the power storage includes one or more power storage modules having a number of power storage modules; and the inverter subsystem further includes: a settings module; and an inverter controller that is configured to: receive the number of power storage modules; store the number of power storage modules in the settings module; and perform at least one power-related decision using the number of power storage modules stored in the settings module.

A benefit to the inverter subsystem (500) described in this example is that only a single type of inverter subsystem needs to be manufactured and supported while still being able to offer a variety of power storage capacities. This may be desirable because it simplifies the manufacturing and maintenance. In contrast, some other providers of power storage systems may have inverter subsystems which are hard coded and/or specifically designed for a fixed number of battery blocks and/or a fixed power storage capacity.

In this example, the settings (506) also include load power information which describes power information associated with the load (509). In one example, the load power information includes load voltage information which describes the voltage(s) at which the load (509) is designed to operate at (e.g., a single voltage level or a range of voltages). Returning briefly to FIG. 3, the load voltage information (e.g., stored in settings (506)) may be used by an inverter controller to properly configure a DC/DC converter (308) to output or otherwise generate a voltage at the DC terminal that is at or within the voltage(s) specified by the load voltage information.

In another example, the load power information includes a load current limit (e.g., a maximum current the load can input without damage to the load). In FIG. 3, for example, a load current limit may be used by an inverter controller to configure the breaker and/or power limiter (306) so that the maximum current specified by the load power information in the settings is not exceeded.

Turning briefly to FIG. 3, in some embodiments where an AC terminal (318) is provided, load power information associated with an AC load that is powered by the AC terminal (318) is obtained, stored, and used, as described above. For example, the load power information for an AC load or terminal may include a load frequency range that the describes the frequency range of an AC power supply that the load is expecting and/or is designed to be powered by.

Returning to FIG. 5, the DC terminal (510) in this example is a power-only connection that only supplies DC power to the load (509). To pass load power information to the settings (506), a side channel (512) is used. In some embodiments, the side channel (512) includes a wireless communication channel (e.g., Bluetooth, WiFi, a cellular data network such as 5G, etc.). In some embodiments, powerline communications over the DC bus is/are used.

In some embodiments, the load (509) has some barcode (e.g., a QR code) and the side channel (512) includes scanning the barcode to obtain scanned information and using the scanned information to obtain the load power information (e.g., using one or more of the techniques described above).

In other embodiments where there is a DC/DC converter (see, e.g., FIG. 3), the load voltage information in the settings (506) may be used to configure a DC/DC converter to output a voltage at the desired and/or specified voltage for that load's particular electrical needs.

In some embodiments, the inverter controller (508) obtains the load power information directly from the load (509) via the side channel (512). For example, the inverter controller (508) may query the load (509) and in response the load may provide its load voltage information or other load power information.

In some embodiments, the inverter controller (508) obtains the load power information indirectly from the load (509) via the side channel (512). For example, the load may provide a device identifier (e.g., a manufacturer identifier and model number) to the inverter controller (508) which in turn uses this information to determine if that load or appliance is suitable to be connected to the DC terminal. For example, a lookup table may be consulted using the device identifier number in order to obtain load voltage information or other load power information for that load.

The following figures describe these examples of the storage and usage of load power information more generally and/or formally in flowcharts.

Figure 6:
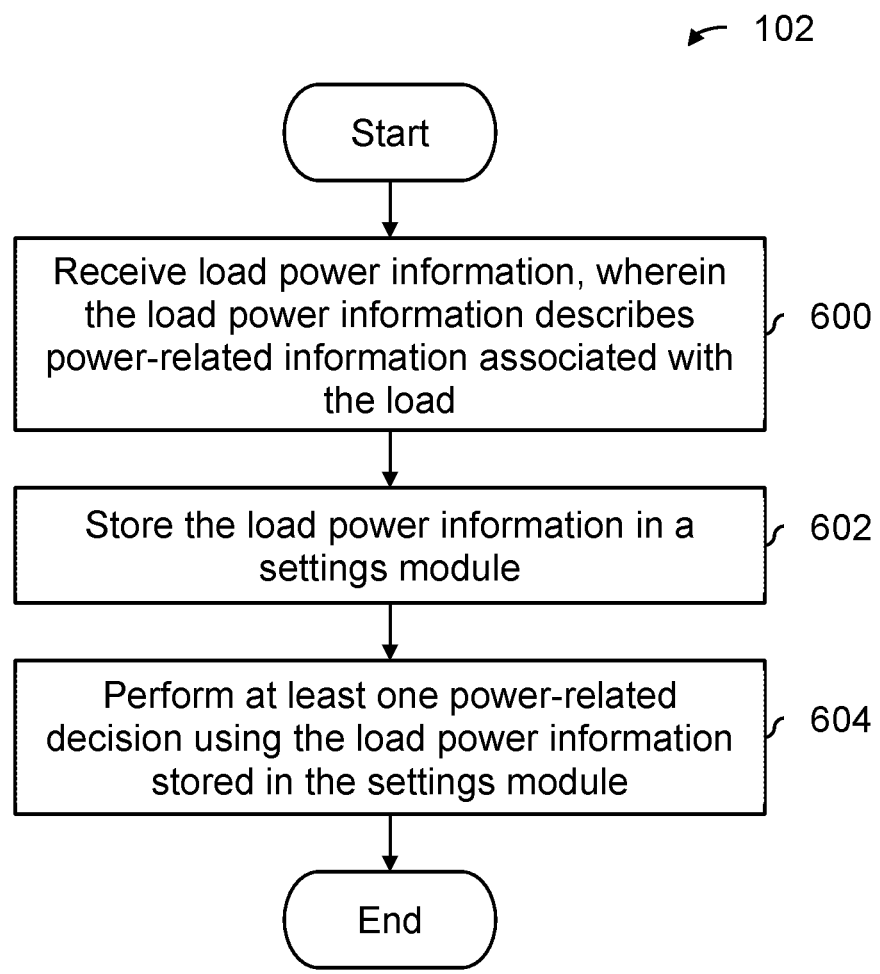
FIG. 6 is a flowchart illustrating an embodiment of a process to provide a DC terminal based at least in part on load power information stored in a settings module.

FIG. 6 is a flowchart illustrating an embodiment of a process to provide a DC terminal based at least in part on load power information stored in a settings module. In some embodiments, the process of FIG. 6 is performed at step 102 in FIG. 1.

At 600, load power information is received, wherein the load power information describes power-related information associated with the load. In some embodiments, the load power information includes load voltage information that describes one or more voltages that the load is designed to operate at. In some embodiments, the load power information includes the load current limit that describes a maximum current that the load can input without damage to the load. In some embodiments, the setting associated with load power information is configured using information obtained via a side channel that is independent of the DC terminal.

At 602, the load power information is stored in a settings module. In the example of FIG. 5, the load power information is stored in settings module (506) which is part of the inverter subsystem (500), making the load power information stored therein easily accessible to the inverter controller (508) which performs decision making using the load power information.

At 604, at least one power-related decision is performed using the load power information stored in the settings module. In one example, the load power information includes load voltage information and the system does not include a DC/DC converter which can convert the voltage of the DC bus to a desired voltage at the DC terminal. In that example, the inverter controller may use the load voltage information to "turn off" or otherwise disable the DC terminal if the voltage of the DC bus (and similarly, the voltage of the DC terminal) is outside of the range of the load voltage information to avoid damaging the load and/or creating an electrical hazard.

Figure 7:
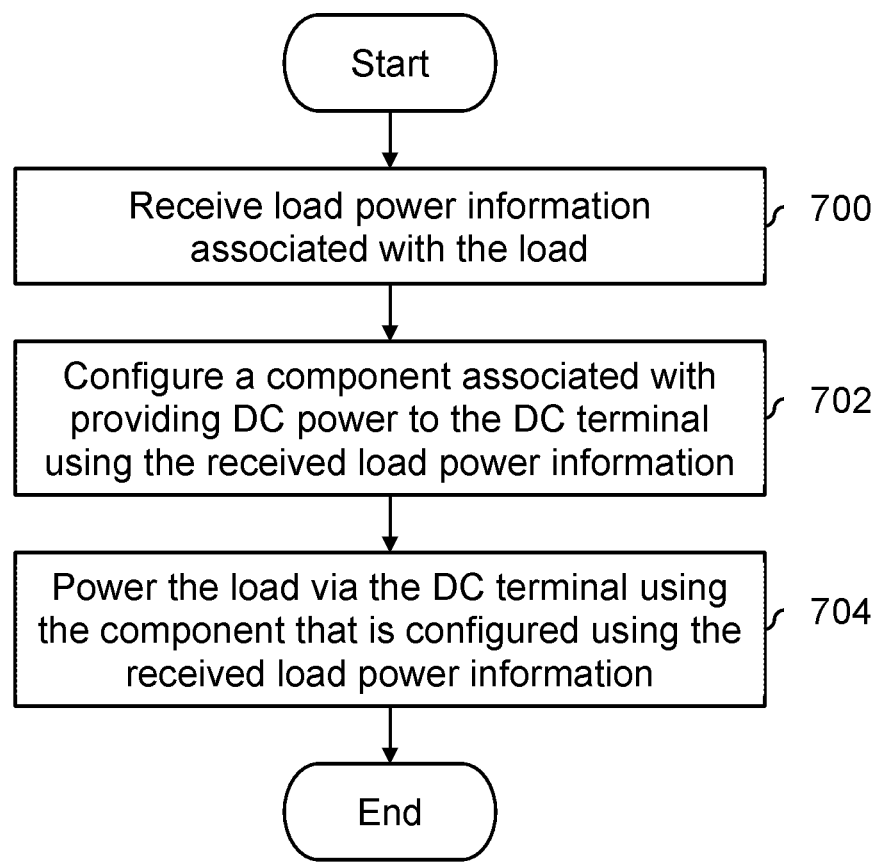
FIG. 7 is a flowchart illustrating an embodiment of a process to configure a component based at least in part on load power information.

FIG. 7 is a flowchart illustrating an embodiment of a process to configure a component based at least in part on load power information. In some embodiments, the process of FIG. 7 is performed at step 102 in FIG. 1.

At 700, load power information associated with the load is received. For example, the load power information may include a load current limit.

At 702, a component associated with providing DC power to the DC terminal is configured using the received load power information. For example, the breaker and/or power limiter (306) in FIG. 3 may be configured with the received load current limit.

At 704, the load is powered via the DC terminal using the component that is configured using the received load power information. For example, by configuring the breaker and/or power limiter (306) in FIG. 3 with the load current limit, the breaker will (electrically) disconnect if the load current limit is exceeded, protecting the load from damage from too much current from the DC terminal.

Returning briefly to FIG. 2, there may be some situations in which power from the expected sources (e.g., the grid (220), the PV array (202), and/or the power storage (206)) is unavailable or insufficient. The following figures describe embodiments where the DC terminal is a bidirectional DC terminal and power can be drawn from a load coupled to the (bidirectional) DC terminal.

Figure 8:
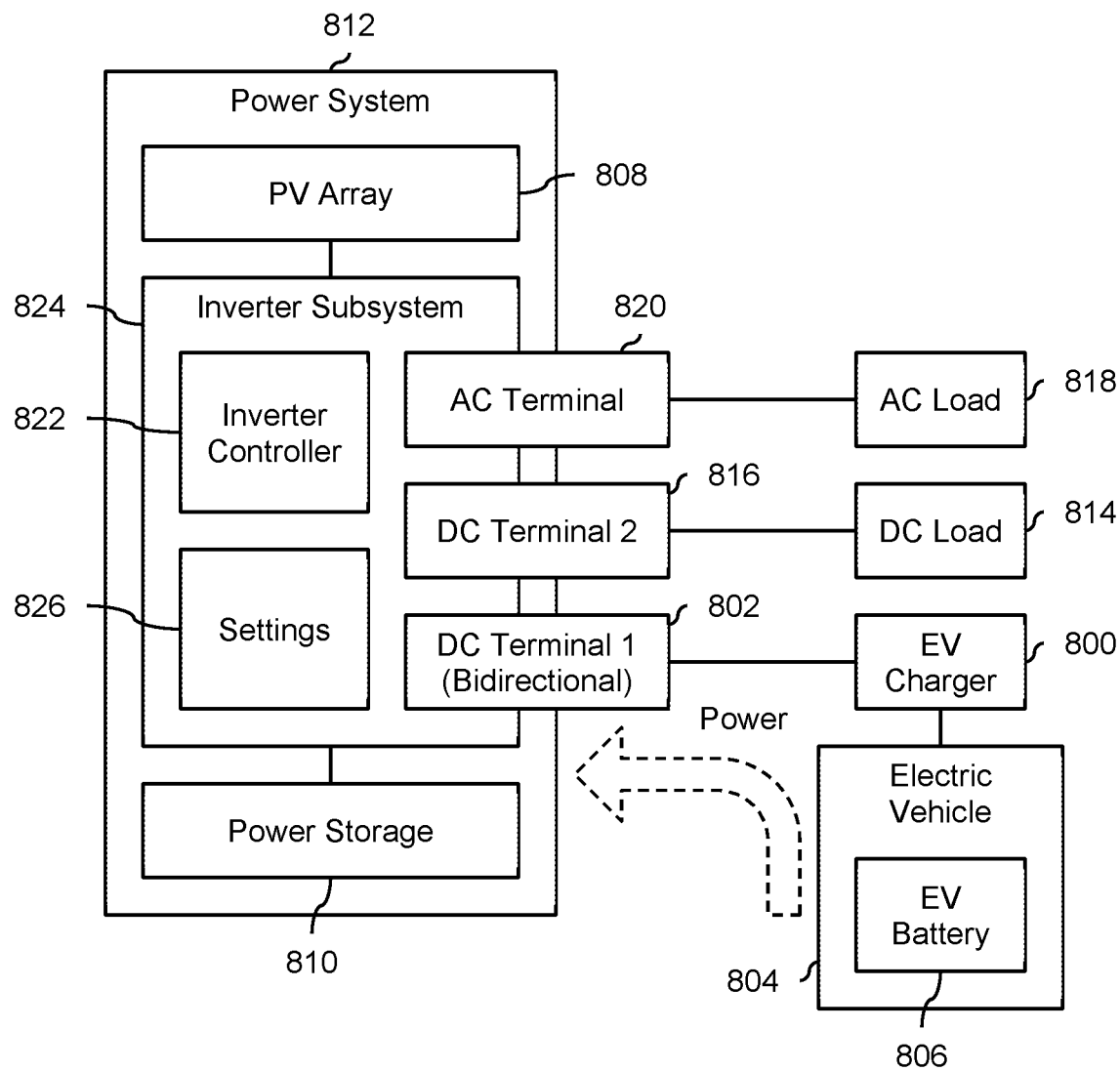
FIG. 8 is a diagram illustrating an embodiment of a bidirectional DC terminal that is used to draw power from a load coupled to the bidirectional DC terminal.

FIG. 8 is a diagram illustrating an embodiment of a bidirectional DC terminal that is used to draw power from a load coupled to the bidirectional DC terminal. In this example, an EV charger (800) is connected to a bidirectional DC terminal (802), also referred to as a first DC terminal. The EV charger (800) in the state shown here is coupled (in turn) to an electric vehicle (804) which includes an EV battery (806). For readability, some components and/or devices which were described above are not shown in this example.

Normally, power to the exemplary home is provided by one or more of the following sources: the PV array (808) or power storage (810), both of which are part of the exemplary power system (812), and/or from the grid (not shown) that the power system (812) is coupled to.

In some cases, all of the power sources described above may have insufficient power. For example, suppose the grid is down for an extended period of time (e.g., due to an extreme weather event, a public power safety shutoff, etc.), the weather is overcast (so that the PV array (808) is generating little or no power), and the power storage (810) is depleted.

In such situations, it may be desirable to draw power from the EV battery (806) using the bidirectional DC terminal (802). For example, a DC load (814) that is powered by a second DC terminal (816) or an AC load (818) that is powered by an AC terminal (820) may be a critically important load, such as a medical device. In various embodiments, the power that is drawn from the EV battery (806) is stored in the power storage (810) and/or is shunted or otherwise directed to the AC load (818) and/or the DC load (814).

In this example, the inverter controller (822) in the inverter subsystem (824) decides if or when to draw power from the EV battery (806) based on one or more settings in the settings module (826). In one example, there are (e.g., pre-defined) settings stored in the settings module (826) so that the inverter controller (822) can draw power from the EV battery (806) even if a homeowner is away from the home and/or a communication channel to the power system (812) is down. For example, the settings may specific a minimum amount of time for the power to be out (e.g., because drawing power from the EV battery is a last resort and should not be performed if the grid comes on relatively quickly), a minimum amount of power that is stored by and/or available to the power system (e.g., again, because drawing power from the EV battery is considered a last resort), and/or the target load that is powered by the power drawn or otherwise pulled from the EV battery.

In some embodiments, an inverter controller draws power from the EV battery in response to an instruction to do so (e.g., which is stored in the settings module (826) and checked by the inverter controller (822)). For example, in some cases, the homeowner may prefer to evacuate the area in the event of a power outage and it is important that the EV battery (806) be as fully charged as possible. This configuration (e.g., of only drawing power from the EV battery when explicitly instructed to do so, as opposed to based on pre-defined conditions or parameters) may permit more user control over if or when power is drawn from an EV battery via a bidirectional DC terminal.

The following figure describes this example more generally and/or formally in a flowchart.

Figure 9:
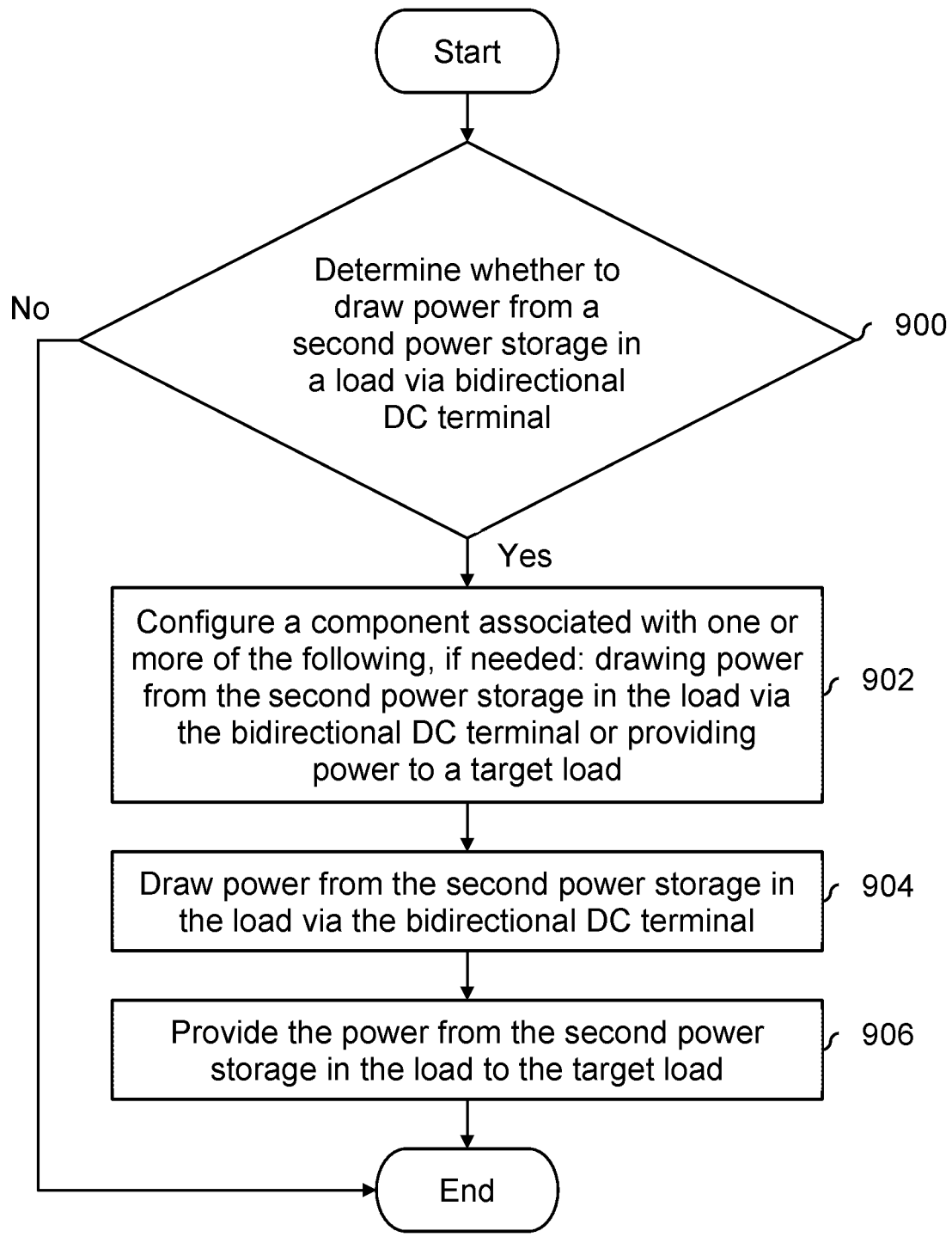
FIG. 9 is a flowchart illustrating an embodiment of a process to draw power from a load via a bidirectional DC terminal.

FIG. 9 is a flowchart illustrating an embodiment of a process to draw power from a load via a bidirectional DC terminal. In this example, the load includes a second power storage (e.g., the EV battery) and the DC terminal is a bidirectional DC terminal. In some embodiments, the process shown here is performed in combination with the process of FIG. 1.

At 900, it is determined whether to draw power from a second power storage in a load via a bidirectional DC terminal. As described above, a settings module (e.g., 826 in FIG. 8) may include pre-defined conditions under which an inverter controller (e.g., 822 in FIG. 8) is permitted or otherwise authorized to pull power from a battery included in a load (e.g., the EV battery (806) in FIG. 8) which in this mode act as a source, not a load. In some embodiments, the determination at 900 is based upon or triggered by a real-time instruction to draw power from the load (e.g., which may be stored in and/or accessed from a settings module).

If it is determined at 900 to draw power, at 902, a component associated with one or more of the following is configured, if needed: drawing power from the second power storage in the load via the bidirectional DC terminal or providing power to a target load. For example, before drawing power from (a battery in or accessible via) the load, it may be desirable to turn off other power sources that are supplying power to the load via the bidirectional DC terminal. In another example, a switch associated with selecting a power source for the target load is (re)configured so that the new power source (e.g., an EV battery) is selected instead of an old power source.

At 904, power is drawn from the second power storage in the load via the bidirectional DC terminal. At 906, the power is provided from the second power storage in the load to the target load.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An inverter subsystem, comprising:
a direct current (DC) bus;
a DC terminal, wherein:
the DC terminal is configured to be: (1) connected to the DC bus via an internally-facing side of the DC terminal and (2) connected to a load via an externally-facing side of the DC terminal; and
the load is powered via the DC terminal;
a power storage interface that is configured to be connected to power storage; and
a DC/DC converter located between the DC bus and the DC terminal, wherein:
the DC bus has a continuously variable voltage;
the DC/DC converter generates a fixed voltage from the continuously variable voltage of the DC bus; and
the DC terminal provides the fixed voltage generated by the DC/DC converter to the load.

2. The inverter subsystem recited in claim 1, further including a breaker interface that is configured to be connected to a breaker in a breaker panel.

3. The inverter subsystem recited in claim 1, wherein:
the DC bus and the DC terminal both have a continuously variable voltage; and
the load is able to operate using the continuously variable voltage provided by the DC terminal.

4. An inverter subsystem, comprising:
a direct current (DC) bus;
a DC terminal, wherein:
the DC terminal is configured to be: (1) connected to the DC bus via an internally-facing side of the DC terminal and (2) connected to a load via an externally-facing side of the DC terminal; and
the load is powered via the DC terminal;
a power storage interface that is configured to be connected to power storage;
an AC/DC converter located between the DC bus and a breaker panel; and
an AC terminal, wherein:
the AC terminal is configured to be: (1) connected to the AC/DC converter via an internally-facing side of the AC terminal and (2) connected to a second load via an externally-facing side of the AC terminal; and
the second load is powered via the AC terminal.

5. The inverter subsystem recited in claim 4, wherein:
the DC bus and the DC terminal both have a continuously variable voltage; and
the load is able to operate using the continuously variable voltage provided by the DC terminal.

6. An inverter subsystem, comprising:
a direct current (DC) bus;
a DC terminal, wherein:
the DC terminal is configured to be: (1) connected to the DC bus via an internally-facing side of the DC terminal and (2) connected to a load via an externally-facing side of the DC terminal; and
the load is powered via the DC terminal; and
a power storage interface that is configured to be connected to power storage, wherein:
the inverter subsystem is included in a modular power system;
the power storage includes one or more power storage modules having a number of power storage modules; and
the inverter subsystem further includes:
a settings module; and
an inverter controller that is configured to:
receive the number of power storage modules;
store the number of power storage modules in the settings module; and
perform at least one power-related decision using the number of power storage modules stored in the settings module.

7. The inverter subsystem recited in claim 6, wherein:
the DC bus and the DC terminal both have a continuously variable voltage; and
the load is able to operate using the continuously variable voltage provided by the DC terminal.

8. An inverter subsystem, comprising:
a direct current (DC) bus;
a DC terminal, wherein:
the DC terminal is configured to be: (1) connected to the DC bus via an internally-facing side of the DC terminal and (2) connected to a load via an externally-facing side of the DC terminal; and
the load is powered via the DC terminal;
a power storage interface that is configured to be connected to power storage;
a settings module; and an inverter controller that is configured to:
  receive load power information, wherein the load power information describes power-related information associated with the load;
  store the load power information in the settings module; and
  perform at least one power-related decision using the load power information stored in the settings module.

9. The inverter subsystem recited in claim 8, wherein the load power information includes one or more of the following: (1) load voltage information that describes one or more voltages that the load is designed to operate at or (2) a load current limit that describes a maximum current that the load can input without damage to the load.

10. The inverter subsystem recited in claim 8, wherein:
the DC bus and the DC terminal both have a continuously variable voltage; and
the load is able to operate using the continuously variable voltage provided by the DC terminal.

11. An inverter subsystem, comprising:
a direct current (DC) bus;
a DC terminal, wherein:
  the DC terminal is configured to be: (1) connected to the DC bus via an internally-facing side of the DC terminal and (2) connected to a load via an externally-facing side of the DC terminal; and
  the load is powered via the DC terminal; and
a power storage interface that is configured to be connected to power storage, wherein:
  the load includes a second power storage;
  the DC terminal includes a bidirectional DC terminal;
  the inverter subsystem further includes an inverter controller that is configured to:
    determine whether to draw power from the second power storage in the load via the bidirectional DC terminal; and
    configure a component associated with the drawing power from the second power storage in the load via the bidirectional DC terminal or providing power to a target load, if needed; and
  the bidirectional DC terminal is further configured to draw the power from the second power storage in the load, wherein the power from the second power storage in the load is provided to the target load.

12. The inverter subsystem recited in claim 11, wherein:
the DC bus and the DC terminal both have a continuously variable voltage; and
the load is able to operate using the continuously variable voltage provided by the DC terminal.

13. A method, comprising:
providing a direct current (DC) bus;
providing a DC terminal, wherein:
  the DC terminal is configured to be: (1) connected to the DC bus via an internally-facing side of the DC terminal and (2) connected to a load via an externally-facing side of the DC terminal; and
  the load is powered via the DC terminal;
providing a power storage interface that is configured to be connected to power storage; and
providing a DC/DC converter located between the DC bus and the DC terminal, wherein:
  the DC bus has a continuously variable voltage;
  the DC/DC converter generates a fixed voltage from the continuously variable voltage of the DC bus; and
  the DC terminal provides the fixed voltage generated by the DC/DC converter to the load.

14. The method recited in claim 13, further including providing a breaker interface that is configured to be connected to a breaker in a breaker panel.

15. The method recited in claim 13, wherein:
the DC bus and the DC terminal both have a continuously variable voltage; and
the load is able to operate using the continuously variable voltage provided by the DC terminal.

16. A method, comprising:
providing a direct current (DC) bus;
providing a DC terminal, wherein:
  the DC terminal is configured to be: (1) connected to the DC bus via an internally-facing side of the DC terminal and (2) connected to a load via an externally-facing side of the DC terminal; and
  the load is powered via the DC terminal;
providing a power storage interface that is configured to be connected to power storage;
providing an AC/DC converter located between the DC bus and a breaker panel; and
providing an AC terminal, wherein:
  the AC terminal is configured to be: (1) connected to the AC/DC converter via an internally-facing side of the AC terminal and (2) connected to a second load via an externally-facing side of the AC terminal; and
  the second load is powered via the AC terminal.

17. A method, comprising:
providing a direct current (DC) bus;
providing a DC terminal, wherein:
  the DC terminal is configured to be: (1) connected to the DC bus via an internally-facing side of the DC terminal and (2) connected to a load via an externally-facing side of the DC terminal; and
  the load is powered via the DC terminal; and
providing a power storage interface that is configured to be connected to power storage, wherein:
  the inverter subsystem is included in a modular power system;
  the power storage includes one or more power storage modules having a number of power storage modules; and
  the inverter subsystem further includes:
    a settings module; and
    an inverter controller that is configured to:
      receive the number of power storage modules;
      store the number of power storage modules in the settings module; and
      perform at least one power-related decision using the number of power storage modules stored in the settings module.

18. A method, comprising:
providing a direct current (DC) bus;
providing a DC terminal, wherein:
  the DC terminal is configured to be: (1) connected to the DC bus via an internally-facing side of the DC terminal and (2) connected to a load via an externally-facing side of the DC terminal; and
  the load is powered via the DC terminal;
providing a power storage interface that is configured to be connected to power storage;
providing a settings module; and
providing an inverter controller that is configured to:
  receive load power information, wherein the load power information describes power-related information associated with the load;
  store the load power information in the settings module; and perform at least one power-related decision using the load power information stored in the settings module.

19. The method recited in claim 18, wherein the load power information includes one or more of the following: (1) load voltage information that describes one or more voltages that the load is designed to operate at or (2) a load current limit that describes a maximum current that the load can input without damage to the load.

20. A method, comprising:

providing a direct current (DC) bus;

providing a DC terminal, wherein:

the DC terminal is configured to be: (1) connected to the DC bus via an internally-facing side of the DC terminal and (2) connected to a load via an externally-facing side of the DC terminal; and the load is powered via the DC terminal; and providing a power storage interface that is configured to be connected to power storage, wherein:

the load includes a second power storage;

the DC terminal includes a bidirectional DC terminal;

the inverter subsystem further includes an inverter controller that is configured to:

determine whether to draw power from the second power storage in the load via the bidirectional DC terminal; and configure a component associated with the drawing power from the second power storage in the load via the bidirectional DC terminal or providing power to a target load, if needed; and the bidirectional DC terminal is further configured to draw the power from the second power storage in the load, wherein the power from the second power storage in the load is provided to the target load.

* * * * *